(12) United States Patent
Lauble et al.

(10) Patent No.: US 11,867,276 B2
(45) Date of Patent: Jan. 9, 2024

(54) SPUR GEAR TRANSMISSION

(71) Applicants: IMS GEAR SE & CO. KGAA, Donaueschingen (DE); CONTINENTAL AUTOMOTIVE TECHNOLOGIES GMBH, Hanover (DE)

(72) Inventors: Michael Lauble, Gottmadingen (DE); Johann Jungbecker, Badenheim (DE); Wilfried Synovzik, Hüfingen (DE)

(73) Assignees: IMS GEAR SE & CO. KGAA, Donaueschingen (DE); CONTINENTAL AUTOMOTIVE TECHNOLOGIES GMBH, Hanover (DE)

( * ) Notice: Subject to any disclaimer, the term of this patent is extended or adjusted under 35 U.S.C. 154(b) by 31 days.

(21) Appl. No.: 17/436,397

(22) PCT Filed: Feb. 19, 2020

(86) PCT No.: PCT/EP2020/054352
§ 371 (c)(1),
(2) Date: Sep. 3, 2021

(87) PCT Pub. No.: WO2020/178027
PCT Pub. Date: Sep. 10, 2020

(65) Prior Publication Data
US 2022/0145979 A1    May 12, 2022

(30) Foreign Application Priority Data
Mar. 4, 2019 (EP) ..................... 19160655

(51) Int. Cl.
*F16H 57/023* (2012.01)
*F16H 1/20* (2006.01)
*F16H 57/02* (2012.01)

(52) U.S. Cl.
CPC ............. *F16H 57/023* (2013.01); *F16H 1/20* (2013.01); *F16H 2057/02021* (2013.01)

(58) Field of Classification Search
CPC ........... F16H 57/033; F16H 2057/0335; F16H 57/023; F16H 1/20; F16H 2057/02021
See application file for complete search history.

(56) References Cited

U.S. PATENT DOCUMENTS 1,918,512 A    7/1933  Helgeby et al.
1,919,512 A *  7/1933  Helgeby .................. B60Q 1/54
                                                        74/325

(Continued)

FOREIGN PATENT DOCUMENTS

CH          293225 A    8/1953
CH          293225 A    9/1953
(Continued)

*Primary Examiner* — Thomas C Diaz
(74) *Attorney, Agent, or Firm* — Nath, Goldberg & Meyer; Jerald L. Meyer; Stanley N. Protigal

(57) ABSTRACT

The present invention relates to a spur gear transmission ($25_1$), comprising
  a transmission housing (12),
  an output gear (14) rotatably mounted in the transmission housing (12) about a first axis of rotation (16),
  a drive gear (18) that is rotatably mounted in the transmission housing (12) about a second axis of rotation (20), wherein
    the first axis of rotation (16) and the second axis of rotation (20) run parallel to each other and spaced apart by a fixed center distance (A), and
  an idler gear (22), which meshes with the output gear (14) and the drive gear (18) and is rotatably mounted in a carrier part (26) about a third axis of rotation (24), wherein
    the third axis of rotation (24) runs parallel to the first axis of rotation (16) and to the second axis of rotation (20) and (Continued)

the carrier part (26) can be placed in a receptacle (37) of the transmission housing (12) and is designed in such a way that the third axis of rotation (24) can be moved perpendicular to the first axis of rotation (16) and/or to the second axis of rotation (20) in order to compensate for differences in diameter of the output gear (14), the drive gear (18) and the idler gear (22).

9 Claims, 3 Drawing Sheets

(56) References Cited

U.S. PATENT DOCUMENTS

| | | | | |
|---|---|---|---|---|
| 2,436,746 | A * | 2/1948 | Drought | F16H 3/001 |
| | | | | 212/331 |
| 3,236,114 | A * | 2/1966 | Freber | A63H 31/00 |
| | | | | 74/606 R |
| 3,306,107 | A * | 2/1967 | Freber | F16H 3/001 |
| | | | | 74/352 |
| 3,465,608 | A * | 9/1969 | Bachi | F16H 3/001 |
| | | | | 74/325 |
| 10,948,047 | B1 * | 3/2021 | Schultz | F16H 57/025 |
| 10,948,947 | B2 | 3/2021 | Schultz | |
| 2008/0138562 | A1 * | 6/2008 | Kotthoff | B22F 7/06 |
| | | | | 428/66.1 |
| 2021/0001366 | A1 * | 1/2021 | Yoon | G07F 13/00 |

FOREIGN PATENT DOCUMENTS

| | | |
|---|---|---|
| CN | 105782406 A | 7/2016 |
| CN | 108351019 A | 10/2016 |
| CN | 107000141 A | 8/2017 |
| CN | 109083981 A | 12/2018 |
| DE | 1284238 B | 11/1968 |
| DE | 102009027509 A1 | 1/2011 |
| DE | 102012216227 A1 | 3/2014 |
| DE | 102017212724 A1 | 1/2019 |
| EP | 0962349 A2 | 12/1999 |

* cited by examiner

SPUR GEAR TRANSMISSION

CROSS-REFERENCE TO RELATED APPLICATIONS

This is a National Phase Application filed under 35 U.S.C. 371 as a national stage of PCT/EP2020/054352, filed Feb. 19, 2020, an application claiming the benefit of European Application No. 19160655.7, filed Mar. 4, 2019, the content of each of which is hereby incorporated by reference in its entirety.

BACKGROUND

The present invention relates to a spur gear transmission. Due to their comparatively simple construction, spur gear transmissions are used in many areas of drive technology when gearing up or gearing down and/or a torque conversion are required. In particular in automobile construction, electric motors are used in many cases to adjust components that can be displaced relative to one another, but they emit a relatively high nominal speed and a comparatively low torque. With spur gear transmissions, the speed can be lowered and the torque increased. Examples in which spur gear transmissions are used are parking and service brakes of vehicles.

In the simplest embodiment of spur gear transmissions, an output gear that can be rotated about a first axis of rotation engages in a drive gear that can be rotated about a second axis of rotation, wherein the first axis of rotation and the second axis of rotation run parallel to each other. However, the center distances that can be realized in this embodiment are limited. In order to standardize the center distances for a modular system, at least one idler gear is used, which rotates about a third axis of rotation and engages both with the drive gear and with the output gear. There is no direct engagement between the drive gear and the output gear in this case. Such a spur gear transmission is shown in CH 293 225 A.

In the case of such spur gear transmissions, there is a requirement, in particular on the basis of the standardization and the cost reduction which can thus be achieved, that the center distance between the first axis of rotation and the second axis of rotation is fixed, but that different transmission or reduction ratios should nevertheless be feasible. The modifications necessary for this purpose on the spur gear transmission and in particular on the transmission housing should be kept as low as possible. A common procedure is to leave the output gear unchanged and only change the diameter of the idler gear and the drive gear as well as the corresponding toothing parameters. Depending on the application, it may also be desired to leave the drive gear unchanged and change the output gear correspondingly, but also to leave the center distance unchanged in this case. Due to the fixed predetermined center distance between the first axis of rotation and the second axis of rotation, however, the arrangement of the third axis of rotation must be changed in order to enable an optimal engagement. Consequently, the transmission housing has to be adapted at least to the extent that the third axis of rotation can be arranged accordingly, which entails a not inconsiderable outlay, as a result of which certain limits are set for standardization.

SUMMARY

The object of an embodiment of the present invention is, therefore, to further develop a spur gear transmission of the above-mentioned type in such a way that different transmission or reduction ratios can be realized without the need for substantial modifications to the transmission housing.

This object is solved with the features specified in claim 1. Advantageous embodiments are the subject of the dependent claims.

An embodiment of the invention relates to a spur gear transmission, comprising
  a transmission housing,
  an output gear rotatably mounted in the transmission housing about a first axis of rotation,
  a drive gear that is rotatably mounted in the transmission housing about a second axis of rotation, wherein
    the first axis of rotation and the second axis of rotation run parallel to each other and spaced apart by a fixed center distance, and
  an idler gear, which meshes with the drive gear and the output gear and is rotatably mounted in a carrier part about a third axis of rotation, wherein
    the third axis of rotation runs parallel to the first axis of rotation and to the second axis of rotation and
    the carrier part can be placed in a receptacle of the housing and is designed in such a way that the third axis of rotation can be moved perpendicular to the first axis of rotation and/or to the second axis of rotation in order to compensate for differences in diameter of the drive gear, the output gear and/or the idler gear.

In the spur gear transmission according to the proposal, a carrier part is provided which is designed in such a way that the third axis of rotation, about which the idler gear rotates, can be moved perpendicular to the first and second axis of rotation. In other words, the third axis of rotation can be moved towards or away from the first or second axis of rotation. If the diameter of the idler gear and the drive gear is changed, for example, the third axis of rotation can be placed in the necessary position, which is necessary for an optimal engagement, on account of the ability to move. In order to provide the ability to move perpendicular to the first axis of rotation and perpendicular to the second axis of rotation, the third axis of rotation can be mounted with correspondingly acting elastic elements such as springs or the like. It is not necessary for the position of the third axis of rotation to be preset. Rather, the position arises automatically during the assembly of the spur gear transmission from the diameters of the gears used. It is sufficient to adjust only the drive gear and the idler gear accordingly. Further modifications are necessary only on the carrier part itself, but above all not on the transmission housing, so that the number of common parts of the spur gear transmission can be kept high and at the same time different transmission or reduction ratios can be realized. Depending on the application, the drive gear can remain unchanged, so that only the output gear and the idler gear have to be adjusted accordingly.

Furthermore, by means of the module used, the strengths, in particular of the drive gear and the output gear, can be flexibly adapted at a given center distance. Although not a primary object of the present invention, the center distance between the drive gear and the output gear can also be changed.

In the case of the above-mentioned CH 293 225 A, the third axis of the idler gear is mounted by means of a self-aligning bearing, whereby a certain angular mobility of the third axis is provided. As a result, it is possible to compensate for inclinations, shaft deflections or misalignments and to prevent excessive wear and, in extreme cases, blockages of the spur gear transmission. In this case, the self-aligning bearing is permanently mounted in the housing of the spur gear transmission according to CH 293 225 A. Different ratios cannot be realized in the spur gear transmission shown there, which makes it clear that CH 293 225 A pursues a different objective than the spur gear transmission according to the present disclosure.

In accordance with a further embodiment, the carrier part has at least one linear guide, with which the carrier part is mounted in the transmission housing in a movable manner in at least one direction perpendicular to the first and second axis of rotation. In this embodiment, the carrier part can be designed in the manner of a slide, which can be moved in a corresponding rail at least along a direction perpendicular to the first and second axis of rotation. The linear guide creates a bearing that resembles or corresponds to a floating mounting. In this embodiment, the movability of the carrier part can be realized in a simple manner. As mentioned, the third axis of rotation is arranged on the carrier part. In this exemplary embodiment, it is not the third axis of rotation itself that is mounted in a directly movable manner, but rather the carrier part is mounted in relation to the transmission housing, so that the third axis of rotation itself can be firmly connected to the carrier part, which is technically simple and therefore inexpensive to implement.

In a further embodiment, the first axis of rotation and the second axis of rotation may lie on a connecting straight line and the third axis of rotation may be arranged at a distance from the connecting straight line. The third axis of rotation is therefore not aligned with the first axis of rotation and the second axis of rotation, but is arranged offset to the connecting straight line, which connects the first axis of rotation and the second axis of rotation. As a result, the degree of freedom in the selection of the gears can be increased without having to make significant changes to the transmission housing.

In a further embodiment, the spur gear transmission can have form-fitting means with which the carrier part is guided and/or secured in the transmission housing. Form-fitting means can be, for example, stops or feather keys which allow guidance in a first direction, but limit the ability to move in a second direction running perpendicular to the first direction, as a result of which the carrier part can be secured from falling out of the transmission housing. The form-fitting means can be provided in a simple manner without significantly complicating the ability to mount the spur gear transmission.

In a further embodiment, the drive gear can be mounted in a first transmission housing part and the output gear in a second transmission housing part, wherein the first transmission housing part and the second transmission housing part are connected to one another in a detachable manner and the carrier part, in the connected state, protrudes into the first transmission housing part and the second transmission housing part. In this embodiment, the ability to mount the spur gear transmission is particularly favorable, since the carrier part can already be introduced into one of the two housing parts and pre-fixed there before the two transmission housing parts are connected to one another, in particular screwed together. The first transmission housing part and the second transmission housing part can also be largely pre-assembled, so that the spur gear transmission is largely completed after the two housing parts have been connected. The first transmission housing part and the second transmission housing part can be connected to one another with a defined interface, so that, for example, different second transmission housing parts, in which drive gears with different diameters are mounted, can be connected to the same first transmission housing part. As a result, the number of feasible transmission or reduction ratios can be further increased with comparatively little technical effort.

A further embodiment is characterized in that the linear guide has a first linear guide section and a second linear guide section, wherein the first linear guide section interacts with the first transmission housing part and the second linear guide section interacts with the second transmission housing part. In this embodiment, an incorrect assembly of the carrier part can be avoided, since the carrier part can only be inserted into the first transmission housing part and the second transmission housing part in a specific orientation.

In accordance with a further embodiment, the spur gear transmission has actuators with which the movability of the third axis of rotation is adjustable. The actuators can be designed, for example, as adjusting screws. The idler gear can be preloaded with respect to the drive gear and the output gear and thus the play within the spur gear transmission can be adjusted. In addition, tolerances can also be compensated for, so that the idler gear, the drive gear and the output gear can be manufactured with a lower precision and thus more cost-effectively.

A further embodiment is characterized in that the output gear is made of a first material, the drive gear is made of a second material, and the idler gear is made of a third material. The above-mentioned possibility of compensating for tolerances is particularly effective when different materials are used. In particular, it is possible to use plastic gears produced by means of injection molding, which do not have to be reworked in order to provide the necessary tolerances. In addition, particularly favorable material pairings can be realized, as a result of which the noise generation and the service life of the spur gear transmission according to the proposal can be increased.

In accordance with a further embodiment, the drive gear and/or the output gear are interchangeably mounted in the transmission housing, the idler gear being interchangeably mounted in the carrier part. On the one hand, the interchangeability facilitates repairs in the event of damage; on the other hand, an existing spur gear transmission can be equipped with a different transmission or reduction ratio with comparatively little effort. A corresponding conversion can therefore be implemented comparatively easily.

BRIEF DESCRIPTION OF THE DRAWINGS

Exemplary embodiments of the invention are explained in more detail below with reference to the accompanying drawings. In the drawings.

DETAILED DESCRIPTION

Figure 1A:
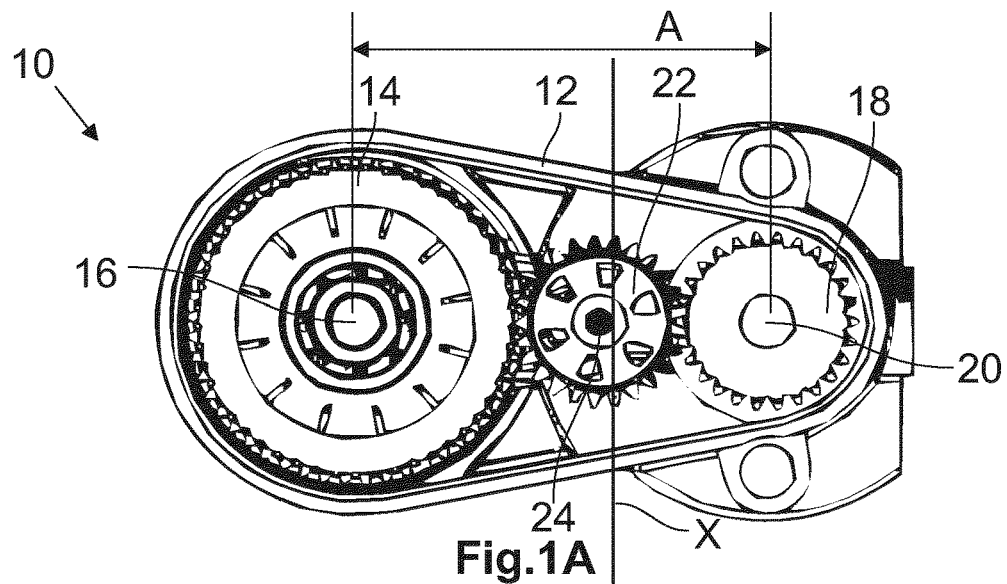
FIGS. 1A to 1C show a spur gear transmission according to prior art in different configurations on the basis of a basic top view.
Figure 1B:
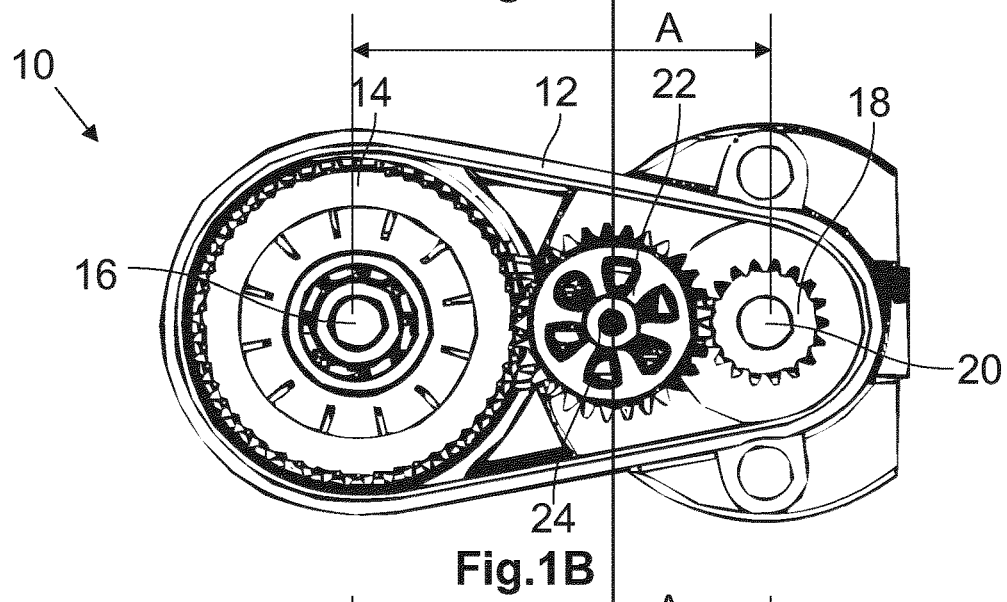
Figure 1C:
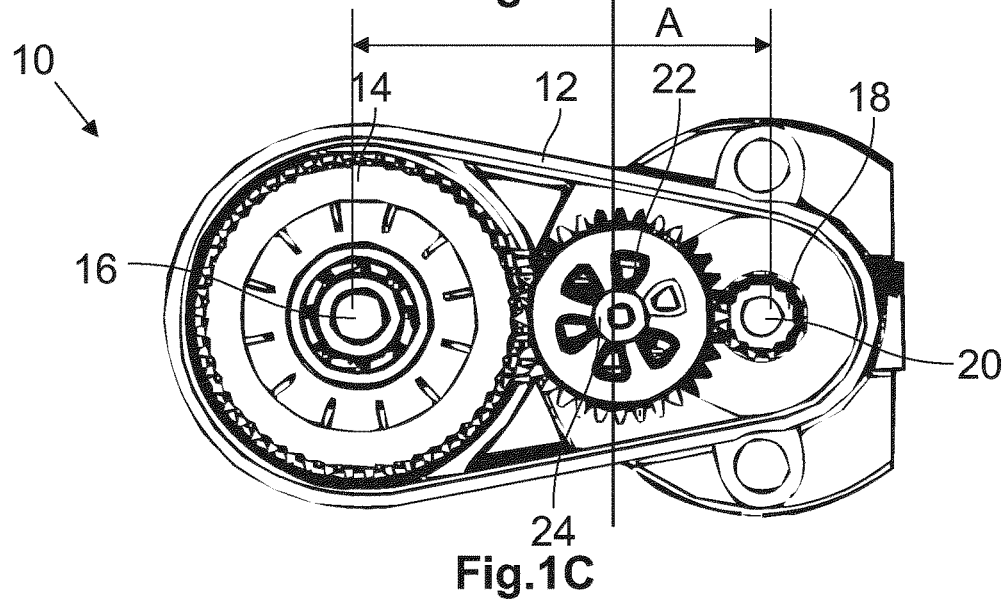

In FIGS. 1A to 1C, a spur gear transmission 10 according to prior art is shown on the basis of a basic top view in various configurations. The spur gear transmission 10 has a transmission housing 12 in which an output gear 14 is rotatably mounted about a first axis of rotation 16, a drive gear 18 about a second axis of rotation 20 and an idler gear 22 about a third axis of rotation 24. The first axis of rotation 16, the second axis of rotation 20 and the third axis of rotation 24 run parallel to each other. The idler gear 22 is in meshing engagement with the drive gear 18 and the output gear 14, so that there is no direct engagement between the drive gear 18 and the output gear 14.

The drive gear 18 and the output gear 14 are arranged at a center distance A from each other, which is the same in all three configurations. The different configurations of the spur gear transmission 10 differ as follows: While the output gear 14 is the same in all three configurations and in particular has the same diameter, the drive gear 18 and the idler gear 22 have different diameters. While the diameter of the drive gear 18 decreases from the first configuration shown in FIG. 1A to the third configuration shown in FIG. 1C, the diameter of the idler gear 22 increases accordingly. As a result, different transmission and reduction ratios can be represented at the same center distance A.

Since the center distance A between the drive gear 18 and the output gear 14 is the same in all three configurations, the position of the third axis of rotation 24 must be adjusted accordingly in order to ensure an engagement of the idler gear 22 in the drive gear 18 and the output gear 14. For clarity, a reference line X is drawn in FIGS. 1A to 1C, which runs through the center of the third axis of rotation 24 in the second configuration (FIG. 1B). With regard to the representations selected in FIGS. 1A to 1C, the third axis of rotation 24 in the first configuration (FIG. 1A) runs offset to the left of the reference line X, while in the third configuration (FIG. 1C) the third axis of rotation 24 runs offset to the right of the reference line X. The consequence of this is that the transmission housing 12 has to be adapted to the different configurations shown in FIGS. 1A to 1C, so that it is not possible to realize different transmission and reduction ratios with identical transmission housings 12.

Figure 2:
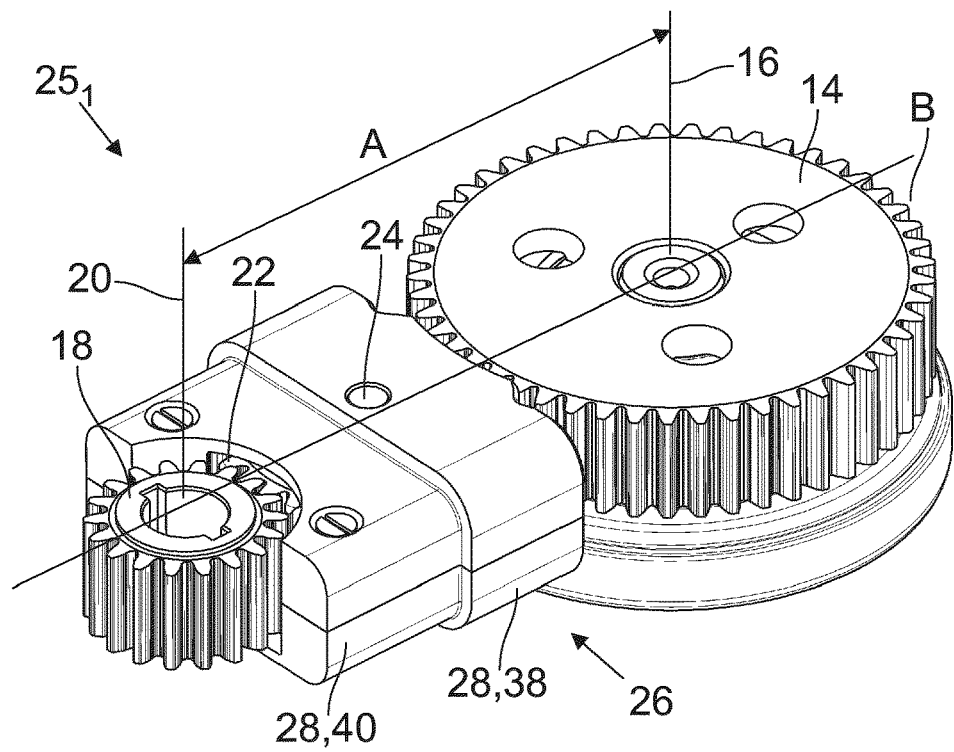
FIG. 2 shows a perspective representation of an exemplary embodiment of a spur gear transmission according to the invention without a transmission housing.
Figure 3:
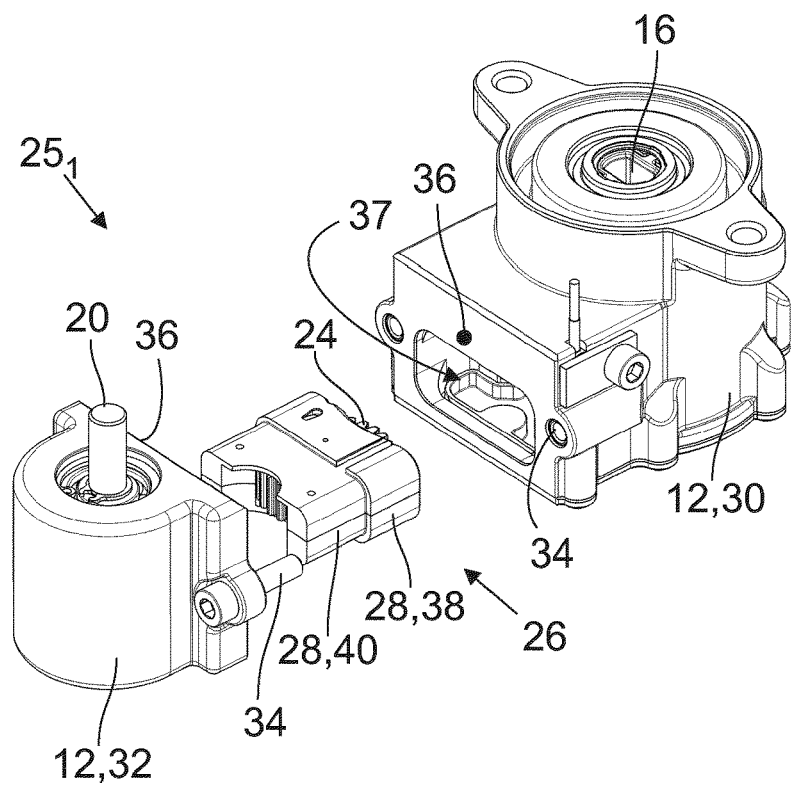
FIG. 3 shows a perspective exploded representation of a transmission housing of a spur gear transmission according to the invention without gears.

In FIG. 2, a first embodiment of a spur gear transmission $25_1$ according to the invention is shown on the basis of a perspective representation without a transmission housing 12, while the transmission housing 12 of the first embodiment of the spur gear transmission $25_1$ according to the invention is also shown in FIG. 3 on the basis of a perspective representation. The spur gear transmission $25_1$ according to the invention also has the drive gear 18, the output gear 14 and the idler gear 22, wherein the idler gear 22 is in meshing engagement with the drive gear 18 and the output gear 14. As can be seen in particular from FIG. 2, the idler gear 22 is arranged on a carrier part 26, on which the third axis of rotation 24 is arranged in a movable manner perpendicular to the first axis of rotation 16 and to the second axis of rotation 20. As can be seen in particular from a comparison of FIGS. 2 and 3, the movability of the third axis of rotation 24 in the illustrated embodiments is realized by means of a linear guide 28 with which the carrier part 26 is mounted in the transmission housing 12. The third axis of rotation 24 as such, on the other hand, is arranged in a stationary manner on the carrier part 26. In the illustrated embodiment, the linear guide 28 causes the third axis of rotation 24 to be able to move toward or away from the first axis of rotation 16 and the second axis of rotation 20.

The third axis of rotation 24 lies on a connecting straight line B, which runs through the first axis of rotation 16 and the second axis of rotation 20, which is not immediately apparent on the basis of the perspective representation from FIG. 2 but is nevertheless true. In this respect, the third axis of rotation 24 is aligned with the first axis of rotation 16 and the second axis of rotation 20. Also in the first embodiment of the spur gear transmission $25_1$, the first axis of rotation 16 and the second axis of rotation 20 are arranged at a fixed center distance A from one another.

As can be seen from FIG. 3, the transmission housing 12 comprises a first transmission housing part 30 and a second transmission housing part 32, which can be detachably connected to one another by means of a screw connection 34. The first transmission housing part 30 and the second transmission housing part 32 lie against each other at an interface 36. The linear guide 28 comprises a first linear guide section 38 and a second linear guide section 40. The transmission housing 12 has a receptacle 37 into which the carrier part 26 can be placed. The receptacle 37 extends both to the first transmission housing part 30 and to the second transmission housing part 32. The first linear guide section 38 is designed in such a way that it can only interact with the part of the receptacle 37 located in the first transmission housing part 30, while the second linear guide section 40 can only interact with the part of the receptacle 37 located in the second transmission housing part 32. Consequently, the carrier part 26, which is designed in the manner of a cassette, can be inserted into the receptacle 37 only in a specific orientation.

Figure 4:
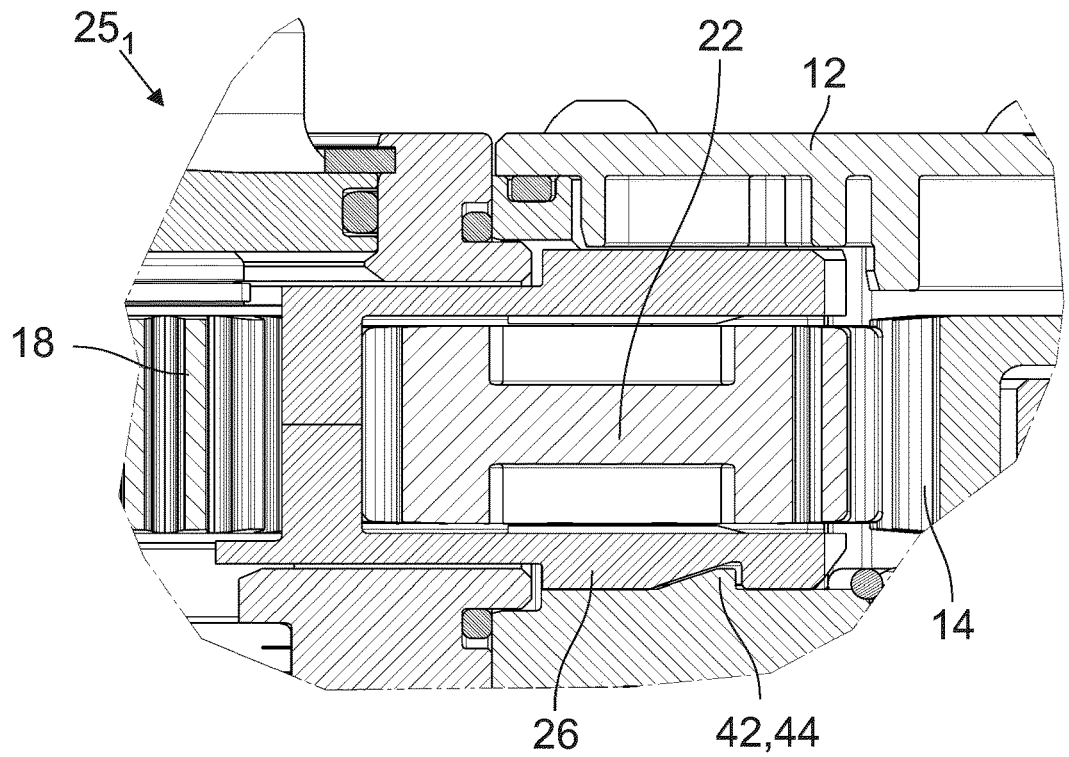
FIG. 4 shows a sectional view through an exemplary embodiment of the spur gear transmission according to the invention.

As can be seen from FIG. 4, the spur gear transmission $25_1$ comprises form-fitting means 42, with which the carrier part 26 is secured in the receptacle 37 (cf. FIG. 3). In the illustrated embodiment, a protrusion 44 is provided, which is engaged from behind by the carrier part 26 in the installed state.

Figure 5:
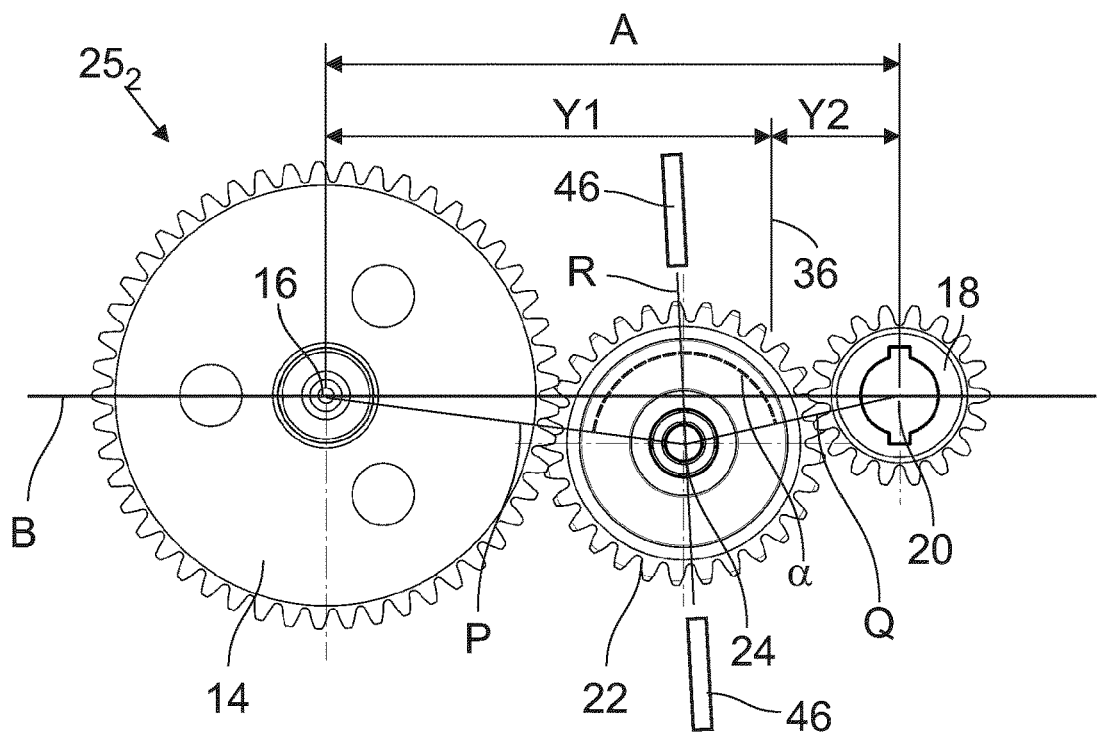
FIG. 5 shows a top view of the gears of a second embodiment of the spur gear transmission according to the invention.

FIG. 5 shows a second embodiment of the spur gear transmission $25_2$ according to the invention on the basis of a top view, in which only the drive gear 18, the output gear 14 and the idler gear 22 are shown. The basic design of the spur gear transmission $25_2$ according to the second exemplary embodiment essentially resembles the first exemplary embodiment of the spur gear transmission $25_1$ according to the invention, which is shown in FIGS. 2 to 4. The essential difference is that the third axis of rotation 24 does not lie on the connecting straight line B, which runs through the first axis of rotation 16 and the second axis of rotation 20. In relation to the representation of FIG. 5, the third axis of rotation 24 is arranged below the connecting straight line B. In this respect, the third axis of rotation 24 is not aligned with the first and second axis of rotation 20. In the second exemplary embodiment, the carrier part 26 is designed in such a way that the third axis of rotation 24 can also be moved along an angle bisector R shown in FIG. 5. The angle bisector R divides an angle α into two equal parts, angle α being enclosed by a first side P and a second side Q. The first side P runs through the first axis of rotation 16 and the third axis of rotation 24, while the second side Q runs through the second axis of rotation 20 and the third axis of rotation 24. In order to be able to adjust the play of the engagement, the spur gear transmission $25_2$ according to the second exemplary embodiment has actuators 46, which are only shown in principle in FIG. 5 and can be designed, for example, as adjusting screws, which can be screwed into a thread of the transmission housing (not shown). The actuators 46 act on the third axis of rotation 24 and are aligned so that they can move the third axis of rotation 24 along the angle bisector R.

In addition, the center distance A is shown in FIG. 5, with which the first axis of rotation 16 and the second axis of rotation 20 are arranged at a distance from one another in the transmission housing 12. Furthermore, the already mentioned interface 36 is drawn in principle in FIG. 5. The interface 36 has a first interface distance Y1 to the first axis of rotation 16 and a second interface distance Y2 to the second axis of rotation 20. The production of the spur gear transmission 10 according to the proposal is simplified in particular when a first material is used for the drive gear 18, a second material for the output gear 14 and a third material for the idler gear 22, which materials differ from each other. For example, a metal-plastic pairing can be realized without, in particular, having to manufacture the plastic gear with an increased tolerance. Consequently, the plastic gear can be manufactured in injection molding without the need for post-processing.

LIST OF REFERENCE NUMBERS 10 spur gear transmission according to prior art
12 transmission housing
14 output gear
16 first axis of rotation
18 drive gear
20 second axis of rotation
22 idler gear
24 third axis of rotation
25 spur gear transmission
$25_1, 25_1$ spur gear transmission
26 carrier part
28 linear guide
30 first transmission housing part
32 second transmission housing part
34 screw connection
36 interface
37 receptacle
38 first linear guide section
40 second linear guide section
42 form-fitting means
44 protrusion
46 actuator
A center distance
B connecting straight line
P first side
Q second side
R angle bisector
X reference line
Y1 first interface distance
Y2 second interface distance
α angle enclosed by P and Q

The invention claimed is:

1. A spur gear transmission (25), comprising
a transmission housing (12),
an output gear (14) rotatably mounted in the transmission housing (12) about a first axis of rotation (16),
a drive gear (18) that is rotatably mounted in the transmission housing (12) about a second axis of rotation (20), wherein
the first axis of rotation (16) and the second axis of rotation (20) run parallel to each other and spaced apart by a fixed center distance (A), and
an idler gear (22), which meshes with the drive gear (14) and the output gear (14) and is rotatably mounted in a carrier part (26) configured in the manner of a cassette, the cassette substantially surrounding the idler gear (22), and mounted about a third axis of rotation (24), wherein the third axis of rotation (24) runs parallel to the first axis of rotation (16) and to the second axis of rotation (20) and
the carrier part (26) can be placed, as said cassette, in a receptacle (37) of the transmission housing (12) and secured therein, and is designed in such a way that the third axis of rotation (24) can be moved perpendicular to the first axis of rotation (16) and/or to the second axis of rotation (20) in order to compensate for differences in diameter of the output gear (14), the drive gear (18) and/or the idler gear (22).

2. The spur gear transmission (25) according to claim 1, characterized in that the carrier part (26) has at least one linear guide (28), with which the carrier part (26) is mounted in the transmission housing (12) in a movable manner in at least one direction perpendicular to the first axis of rotation (16) and the second axis of rotation (20).

3. The spur gear transmission (25) according to claim 1, characterized in that the first axis of rotation (16) and the second axis of rotation (20) lie on a connecting straight line (B) and the third axis of rotation (24) is arranged at a distance from the connecting straight line.

4. The spur gear transmission (25) according to claim 1, characterized in that the spur gear transmission ($25_1$) has form-fitting means (42) with which the carrier part (26) is guided and/or secured in the transmission housing (12).

5. The spur gear transmission (25) according to claim 1, characterized in that the output gear (14) is mounted in a first transmission housing part (30) and the drive gear (18) in a second transmission housing part (32) and the first transmission housing part (30) and the second transmission housing part (32) can be connected to one another in a detachable manner, wherein the carrier part (26), in the connected state, protrudes into the first transmission housing part (30) and the second transmission housing part (32).

6. The spur gear transmission (25) according to claim 2, characterized in that the linear guide (28) has a first linear guide section (38) and a second linear guide section (40), wherein the first linear guide section (38) interacts with the first transmission housing part (30) and the second linear guide section (40) interacts with the second transmission housing part (32).

7. The spur gear transmission (25) according to claim 1, characterized in that the spur gear transmission has actuators (46) with which the movability of the third axis of rotation can be adjusted.

8. The spur gear transmission ($25_1$) according to claim 1, characterized in that the output gear (14) is made of a first material, the drive gear (18) is made of a second material, and the idler gear (22) is made of a third material.

9. The spur gear transmission ($25_1$) according to claim 1, characterized in that
the output gear (14) and/or the drive gear (18) are interchangeably mounted in the transmission housing (12) and
the idler gear (22) is interchangeably mounted in the carrier part (26).

* * * * *